United States Patent
Golshan et al.

(10) Patent No.: US 7,738,493 B2
(45) Date of Patent: Jun. 15, 2010

(54) METHODS AND DEVICES FOR TRANSMITTING DATA BETWEEN STORAGE AREA NETWORKS

(75) Inventors: Ali Golshan, Palo Alto, CA (US); Neelima Mehta, Atlanta, GA (US); Pags Krishnamoorthy, San Jose, CA (US); Madhuri Kolli, San Jose, CA (US); Devi Prasad Ivaturi, San Jose, CA (US); Venkatesh Janakiraman, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 2042 days.

(21) Appl. No.: 10/350,574

(22) Filed: Jan. 23, 2003

(65) Prior Publication Data

US 2004/0146054 A1    Jul. 29, 2004

(51) Int. Cl.
*H04J 3/16* (2006.01)
(52) U.S. Cl. ..................................................... 370/469
(58) Field of Classification Search ............... 370/395.2
See application file for complete search history.

(56) References Cited

U.S. PATENT DOCUMENTS

| | | | |
|---|---|---|---|
| 5,742,607 A | 4/1998 | Beighe et al. | |
| 5,987,519 A * | 11/1999 | Peifer et al. | 709/230 |
| 6,006,275 A | 12/1999 | Picazo et al. | |
| 6,400,730 B1 | 6/2002 | Latif et al. | 370/466 |
| 6,401,171 B1 | 6/2002 | Klein et al. | |
| 6,611,495 B1 | 8/2003 | Meyer et al. | 370/230 |
| 6,760,769 B2 * | 7/2004 | Jayam et al. | 709/228 |
| 6,985,490 B2 * | 1/2006 | Czeiger et al. | 370/401 |
| 7,096,247 B2 | 8/2006 | Jayam et al. | |
| 7,106,751 B2 * | 9/2006 | Miyamoto et al. | 370/401 |
| 7,114,009 B2 | 9/2006 | Jones et al. | |
| 7,171,440 B2 | 1/2007 | Hanner | 709/201 |
| 7,197,047 B2 * | 3/2007 | Latif et al. | 370/466 |
| 7,308,001 B2 * | 12/2007 | Collette et al. | 370/471 |
| 2002/0078028 A1 | 6/2002 | Lisanke | |
| 2002/0141353 A1 | 10/2002 | Ludwig et al. | |
| 2002/0156924 A1 | 10/2002 | Czeiger et al. | |
| 2002/0181506 A1 | 12/2002 | Loguinov | |
| 2003/0028663 A1 * | 2/2003 | Mullendore et al. | 709/234 |

(Continued)

FOREIGN PATENT DOCUMENTS

WO    0128179 A3    4/2001

OTHER PUBLICATIONS

Fibre Channel Over TCP/IP (FCIP) by Rajagopal, Apr. 2001.*

(Continued)

*Primary Examiner*—Anh-Vu Ly
(74) *Attorney, Agent, or Firm*—Weaver Austin Villeneuve & Sampson LLP

(57) ABSTRACT

Methods and devices are provided for efficient transmission of data between storage area networks. According to some aspects of the invention, a "slim" TCP stack is provided which eliminates the socket layer found in a conventional TCP stack, thereby eliminating socket buffers and the associated buffer-to-buffer copying. Moreover, by eliminating the socket layer, one eliminates the listen state. This condition allows TCP processing in an interrupt context instead of client/server operation with a listen state. Accordingly, some aspects of the invention provide for transmitting data between SANs in an interrupt context.

36 Claims, 12 Drawing Sheets

U.S. PATENT DOCUMENTS

| | | | |
|---|---|---|---|
| 2003/0084219 A1* | 5/2003 | Yao et al. | 710/300 |
| 2003/0093541 A1 | 5/2003 | Lolayekar et al. | |
| 2003/0204620 A1 | 10/2003 | Cheng | 709/238 |
| 2004/0013117 A1 | 1/2004 | Hendel et al. | |
| 2004/0146063 A1* | 7/2004 | Golshan et al. | 370/428 |
| 2005/0232269 A1* | 10/2005 | Yao et al. | 370/389 |
| 2006/0209840 A1 | 9/2006 | Paatela et al. | 370/395 |
| 2007/0118665 A1 | 5/2007 | Philbrick et al. | |

OTHER PUBLICATIONS

Rajagopal, et al. Fibre channel over TCP/IP (FCIP), Oct. 2001, p. 6.*

Cisco Systems, "Cisco Catalyst Switching Solutions Guide, Intelligent Switching for the Evolving Network: Easing network migration, adaptation, and expansion." Printed Mar. 29, 2004, www.cisco.com/go/catalyst2950, pp. 1-12.

Golshan, et al., "Methods and Devices for Transmitting Data Between Storage Area Networks", U.S. Appl. No. 10/351,167, filed Jan. 23, 2003, 58 pages.

First Official Action issued Nov. 30, 2005, for the European Patent Application No. 03 768 926.2, filed Nov. 14, 2003, Methods and Devices for Transmitting Data Between Storage Area Networks 11 pp.

Monia, Charles et al., IETF, Standard Track, "iFCP—A Protocol for Internet Fibre Channel Networking", IP Storage Working Group, Dec. 2002, pp. 1-104.

Voruganti, K. and Sarkar, P., "An Analysis of Three Gigabit Networking Protocols for Storage Area Networks", IEEE 0-7803-7001, May 2001, pp. 259-265.

US Office Action, mailed Jan. 26, 2007, from U.S. Appl. No. 10/351,167.

US Office Action, mailed Jul. 26, 2007, from U.S. Appl. No. 10/351,167.

US Office Action, mailed Jan. 28, 2008, from U.S. Appl. No. 10/351,167.

Examiner'Communication and extended European Search Report, pursuant to Rule 44a EPC, mailed Jul. 25, 2007, received Aug. 1, 2007, from European Patent Application No. 07007583.3, Method and Devices for Transmitting Data Between Storage Area Networks, 12 pp.

Examiner's Communication pursuant to Article 94(3) EPC, dated Apr. 4, 2008, from European Patent Application No. 07007583.3, 3 pp.

PCT International Search Report from PCT Application No. PCT/US03/036182 mailed May 8, 2004.

PCT Written Opinion from PCT Application No. PCT/US03/036182 mailed May 8, 2004.

First OA issued Apr. 11, 2008, for the CN Patent Application No. 200380109101.2.

Notice of Grant from EP Patent Application No. 03 768 926.2-2416 mailed Feb. 19, 2007.

US Restriction Requirement, mailed Aug. 4, 2008 from U.S. Appl. No. 10/351,167.

US Office Action, mailed Apr. 13, 2009 from U.S. Appl. No. 10/351,167.

AU Examiner Report mailed Jul. 15, 2008 for AU Patent Application No. 200391522.

Second OA issued Oct. 10, 2008, for CN Patent Application No. 200380109101.2.

Rejection Decision issued Jun. 19, 2009, for CN Patent Application No. 200380109101.2.

Restriction Requirement dated Dec. 24, 2008 from U.S. Appl. No. 10/351,167.

U.S. Final Office Action, mailed Nov. 25, 2009 from U.S. Appl. No. 10/351,167.

AU Examiner Report mailed Aug. 12, 2009 for AU Patent Application No. 2003291522.

Canadian Office Action, dated Dec. 7, 2009, CA Patent Application No. 2,514,086.

Examiner's Communication dated Apr. 4, 2008 from EP Application No. 07007583.3.

PCT International Preliminary Examination Report dated Oct. 28, 2004 from PCT Application No. PCT/US03/036182.

* cited by examiner

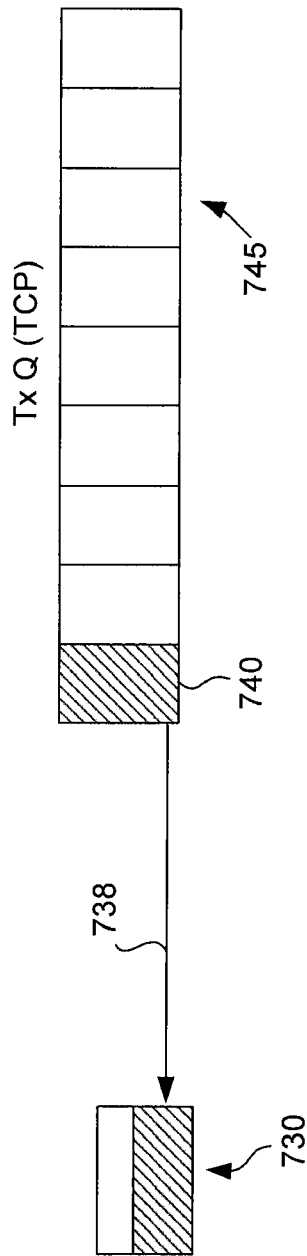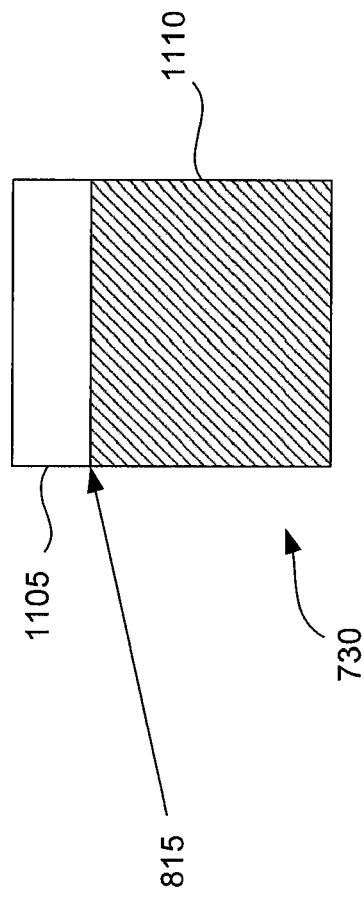

METHODS AND DEVICES FOR TRANSMITTING DATA BETWEEN STORAGE AREA NETWORKS

BACKGROUND OF THE INVENTION

1. Field of the Invention

The present invention generally relates to data networks. More specifically, the invention relates to methods and devices for transmitting data between storage area networks.

2. Description of Related Art

Storage area networks ("SANs") are becoming increasingly popular networks for businesses, universities and governmental entities. Such networks are typically connected via optical fiber, which allows for high-speed data transmission. Many SANs use the Fiber Channel ("FC") protocol for data transmitted via optical fiber.

Difficulties arise when one SAN sends data to and receives data from a remote SAN. If the SANs are using the FC protocol and are transmitting data via the internet, the FC packets from the SANs must be encapsulated according to the TCP/IP protocol for transmission across the Internet. However, conventional methods for encapsulation and de-encapsulation of FC packets are both expensive and inefficient in the way they deal with the networks spanning large distances. These drawbacks can reduce the advantages associated with SANs.

SUMMARY OF THE INVENTION

The present invention provides methods and devices for more efficient transmission of data between storage area networks. According to some aspects of the invention, a "slim" TCP stack is provided which eliminates the overheads associated in context switches (from interrupt-level to process-level), found in conventional TCP stacks, by doing the TCP processing at interrupt level. The invention also provides a method to eliminate buffer copies, found in a conventional TCP stacks. Both these factors—no buffer copies and interrupt-level processing—reduce a large amount of processing overhead. Elimination of the socket layer, which, too, is otherwise found in conventional TCP stacks, adds to the foregoing benefits. One advantage of eliminating the socket layer is the elimination of socket buffers and the associated buffer-to-buffer copying.

The elimination of the socket layer interface also facilitates simplification of the TCP connection establishment process. Typically, TCP end-points interact in a client-server mode. In this mode of operation, the server listens for connection requests from potential clients, before attempting to establish the TCP connection. The client initiates the process of connection establishment. The socket layer in conventional stacks is more complex to allow for both client and server operation in the above manner. In some aspects of the present invention, both TCP end-points are treated as clients, who try to establish the connection simultaneously. Thus, the server related states, and their complexity have been eliminated.

Some aspects of the invention provide a TCP stack embodied in a machine-readable medium for controlling data transmitted between storage area networks. The TCP stack interacts with an application layer, responsible for encapsulating outgoing frames from a first storage area network and de-encapsulating incoming frames from a second storage area network. The TCP stack includes a TCP layer that receives outgoing frames directly from the application layer; an IP layer that interacts with the TCP layer; and a link layer that interacts with the IP layer. However, the TCP stack does not include a socket layer.

The application layer includes an FCIP layer. The link layer may be an Ethernet layer. According to some aspects of the invention, the TCP stack performs processing in an interrupt context.

Other aspects of the invention provide a method for controlling data transmitted between storage area networks. Since the TCP processing is done in an interrupt context, it is necessary to ensure that a restricted amount of time is spent in a single interrupt context. The "slim" TCP helps towards this goal. Additionally, the method includes the following steps: on receiving the first FCIP packet, a TCP header may be added to the FCIP packet, and the FCIP packet is transmitted to the Internet, all in the same interrupt context. For subsequent FCIP packets, transmission will be done on receiving acknowledgements for previously sent packets according to some aspects of the invention. The interrupt context may assign a higher priority to command packets than to data packets.

The steps of receiving, adding and transmitting may be considered a "loop." Accordingly, before transmitting an FCIP packet to the Internet, to restrict the processing done in a single interrupt context, it may be determined whether a maximum number of loops has occurred during the interrupt context.

All of the foregoing methods may be performed according to commands in a computer program. A network device may be configured to perform the foregoing methods.

Some aspects of the invention involve reducing the number of steps involved in the TCP processing of a packet, by advertising a constant advertised window, as explained in detail later. To accommodate this change, (without impacting TCP's essential functionality), TCP acknowledgements are sent only on successfully passing the FCIP packets to the FCIP application. This is unlike conventional stacks, where TCP acknowledgement is sent as soon as TCP receives the packet reliably and in order, even if the application has not been able to receive it, for varied reasons.

BRIEF DESCRIPTION OF THE DRAWINGS

The invention may best be understood by reference to the following description taken in conjunction with the accompanying drawings, which are illustrative of specific embodiments of the present invention.

FIG. 10 illustrates a remaining pointer stored in the transmit queue after a packet has been sent but before an ACK has been received.

FIG. 11 depicts a scratch pad within a memory space.

DETAILED DESCRIPTION OF SPECIFIC EMBODIMENTS

Figure 1:
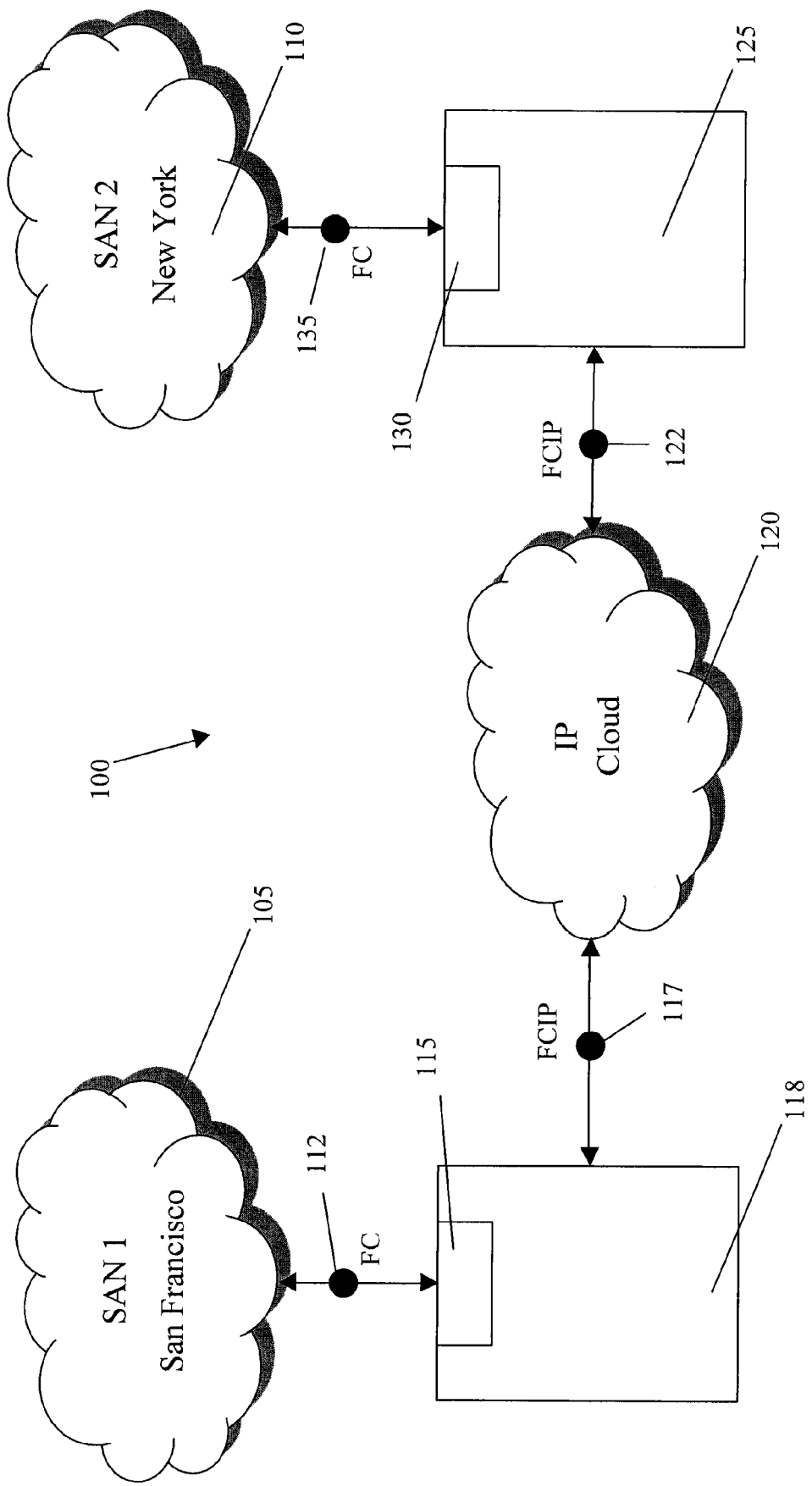
FIG. 1 is a block diagram that outlines some general features of the invention.

FIG. 1 depicts system 100 according to some aspects of the present invention. System 100 includes storage area network ("SAN") 105, which is located in San Francisco in this example. SAN 105 includes a plurality of hosts, data storage devices, switches and/or routers, servers and other components well known to those of skill in the art. Here, SAN 105 is interconnected using optical fiber. A Fiber Channel ("FC") protocol is used for relaying information within SAN 105. SAN 110 is a similar storage area network located in New York. Obviously, SAN 105 and SAN 110 could be located anywhere in the world. Moreover, while only two SANs are illustrated in FIG. 1, any number of SANs could be interconnected in system 100.

Under current conditions, the maximum radius of SANs is on the order of 10 miles. This fact is due in part to the limited deployment of optical fiber in local or municipal networks. However, it is often the case that a user in one SAN, (e.g., SAN 105), will wish to access data in another SAN (e.g., SAN 110). The most common method of accessing data across long distances is via the Internet or a similar network. Such networks typically use the TCP layer of the TCP/IP protocol for such long-distance routing. IP cloud 120 of FIG. 1 depicts such a network.

It is necessary for FC frames 112 and 135 to be encapsulated or otherwise transformed into a format recognizable by IP cloud 120. This is accomplished by encapsulating the FC frames into "FCIP" packets 117 and 122. Here, this encapsulation is performed by cards 115 and 130 of network devices 118 and 125, respectively. Network devices 118 and 125 may be routers, switches or other types of network devices known in the art. Cards 115 and 120 may be port adapter cards such as the Fiber Channel Port Adapter ("FCPA") in the Cat6500 switch, which is manufactured by the assignee. The encapsulation process will be explained in more detail with reference to FIGS. 2 and 3.

In some preferred embodiments, a TCP tunnel is formed between cards 115 and 130. In some such embodiments, a TCP tunnel is formed that includes 2 TCP connections per tunnel. The first connection is for commands, which could be SCSI commands, FC controls (control packets such as Class F frames), etc. The second connection is for data. In some embodiments, command transmissions have priority over data transmissions. However, a TCP tunnel could be formed that includes only 1 TCP connection per tunnel. In such embodiments, both commands and data are sent over the same TCP connection. If cards 115 and 130 are FCPA cards, 4 tunnels are supported, allowing SAN 105 or SAN 110 to connect with up to 4 remote SANs.

In a typical TCP connection, a "client" network device initiates transmissions and a "server" network device enters a "listen" mode during such transmissions. Preferred embodiments of the present invention do not use this client/server model. Instead, cards 115 and 130 simultaneously transmit in "interrupt" context, which will be described in more detail below.

In some embodiments, each TCP connection is defined by four properties, which are collectively referred to herein as a "four-tuple." These properties are source port, destination port, source IP address and destination IP address. According to some embodiments of the invention, the command connection and the data connection have different four-tuples, including different ports, but have the same IP address. A "five-tuple" is a four-tuple plus a specified protocol type, which will be TCP protocol according to preferred aspects of the invention.

Figure 2:
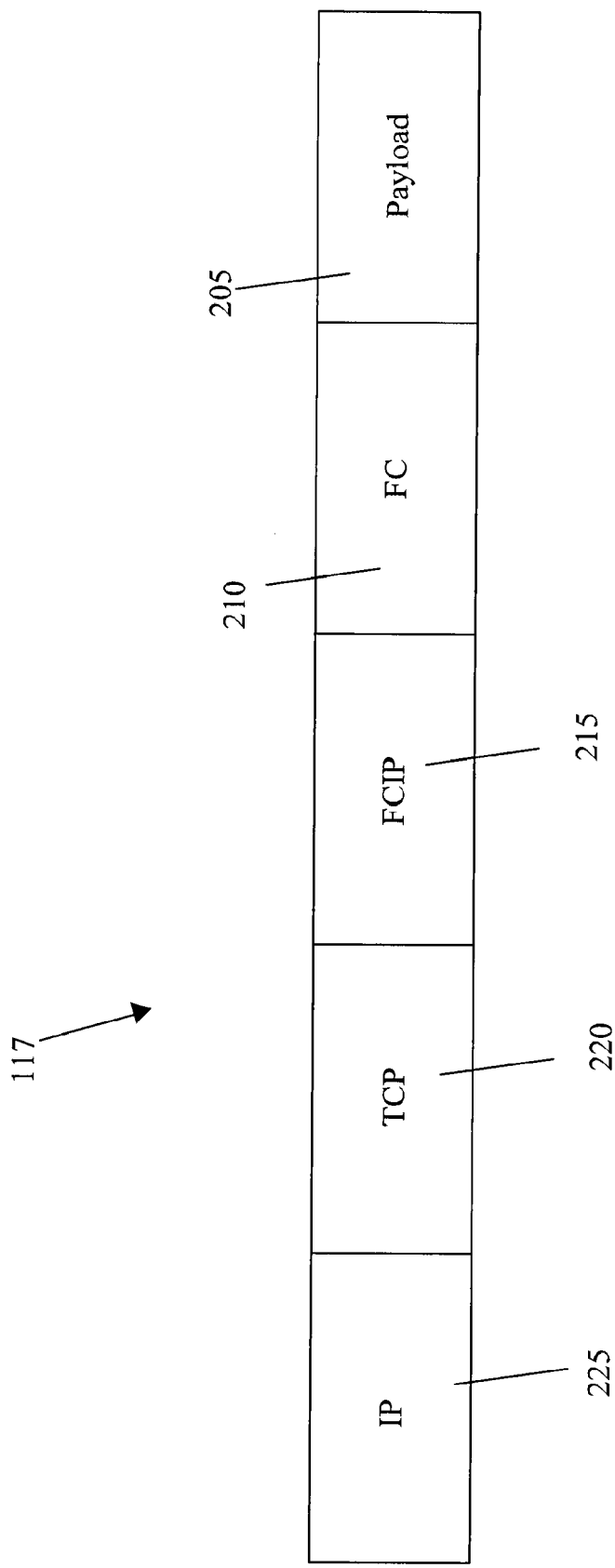
FIG. 2 illustrates an exemplary FCIP packet.

FIG. 2 illustrates a format of FCIP packet 117 according to some embodiments of the invention. Payload 205 and FC header 210 remain from an encapsulated FC frame, such as FC frame 112. In some instances, incoming FC frames may be chopped up into multiple segments. FCIP frame header 215 helps a receiving side properly assemble such segments, in a manner known by those of skill in the art. In this example, card 115 has added FCIP frame header 215, TCP header 220 and IP header 225 to form FCIP packet 117, which may be transmitted across IP cloud 120.

Figure 3:
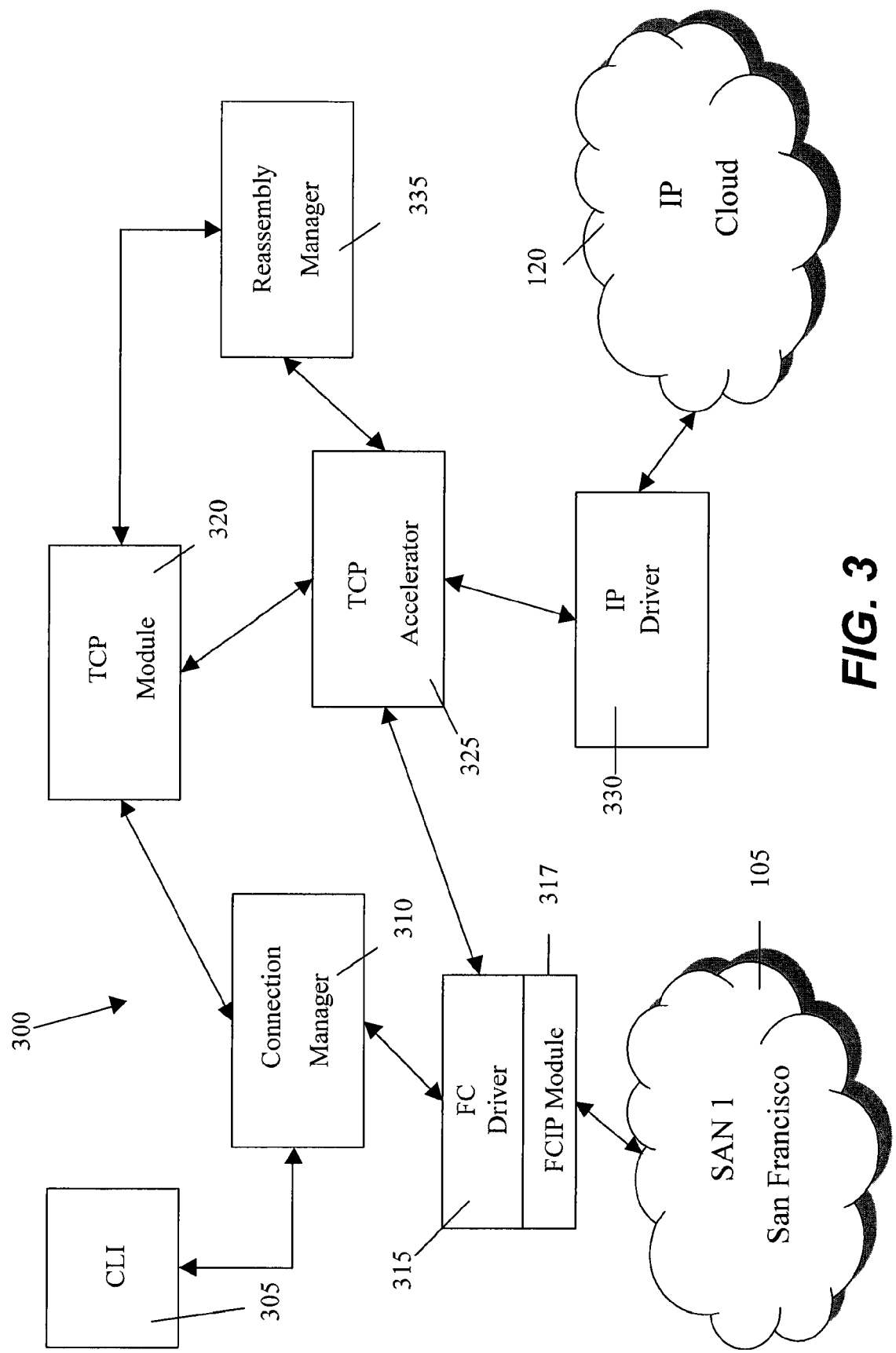
FIG. 3 illustrates one embodiment of the invention.

FIG. 3 illustrates exemplary architecture 300 for performing various methods according to the present invention. In this embodiment, architecture 300 includes five major modules: CLI 305, Connection Manager 310, FC Driver 315, TCP Module 320, TCP Accelerator 325, IP Driver 330 and Reassembly Manager 335. In some embodiments, all modules of architecture 300 are embodied in a single component, such as card 115 or card 130. In other embodiments, architecture 300 is distributed over multiple components, such as a route processor and a card such as a Fiber Channel Port Adapter card. Following is a brief overview of the components of this exemplary embodiment.

FC Driver 315 includes FCIP Module 317, which receives FC frames from SAN 105 and determines whether the FC frames are data frames or command frames. FCIP Module 317 may be implemented as hardware, as software or as a combination of the two. FCIP Module 317 encapsulates the FC frames as FCIP frames and forwards the FCIP frames to either a data frame buffer or a command frame buffer of FC Driver 315. The operation of these buffers will be explained in more detail below with reference to FIGS. 7 through 11.

After FC Driver 315 receives an FCIP frame from FCIP Module 318, FC Driver 315 calls TCP Accelerator 325, which provides an interface between FC Driver 315 and TCP Module 320. TCP Accelerator 325 also provides an interface between IP Driver 330 and TCP Module 320, thereby facilitating the forwarding of packets into or out of IP cloud 120.

CLI module 305 is a block of software that initiates the process of establishing TCP connections. CLI 305 supports TCP configuration management by a user (e.g., a network manager). In this example, network device 118 is a router and CLI module 305 has two components, one of which is on a route processor of router 118, and the other of which is on an FCPA card of router 118.

The portion of CLI module 305 installed on the route processor supports user configuration of tunnels, checks for the validity of the TCP connection four-tuples, sends the configuration information to the FCPA card and processes the connection-related messages from the FCPA card.

The primary function of Connection Manager 310 is to establish connections. Connection Manager 310 processes its message queue, populates a local database and manages the TCP connections. Moreover, Connection Manager 310 brings the FC ports of network device 118 up or down when the connections are established or closed, respectively.

TCP Module 320 does the core job of allowing a segment reliably to be transported to its destination as well as to the application. TCP Module 320 does so by encapsulating FC frames and de-encapsulating FCIP frames. During the encapsulation process, TCP Module 320 appends header information and performs all functions necessary for TCP (e.g., performing a checksum).

IP Driver 330 is an interface between IP cloud 120 and TCP Accelerator 325. IP Driver 330 may be, for example, an Fx1000 chip from Intel corporation, which may be part of a Gigabit Ethernet card.

Figure 4:
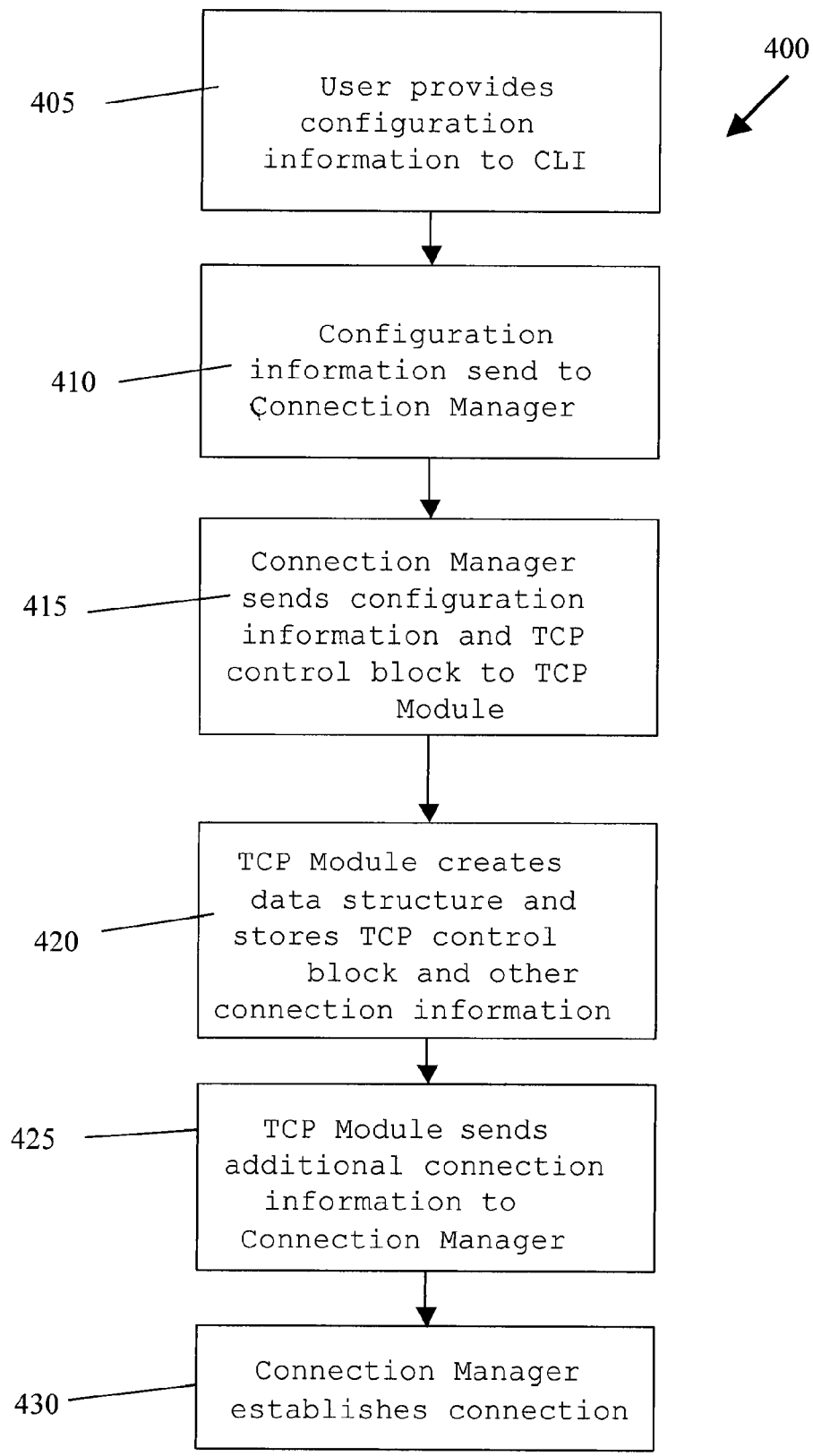
FIG. 4 is a flow chart that outlines the process of establishing a connection according to one aspect of the invention.

The following description will explain the functions of Connection Manager 310 and TCP Module 320 when a connection is being established. In step 405 of FIG. 4, a user, such as a network administrator, provides configuration information to CLI 305 for connections that comprise a TCP tunnel to be formed between cards 115 and 130. Such information includes source port, source IP address, destination port and destination port IP address, the 4-tuple information discussed above. In some embodiments, each tunnel includes two connections, one for commands and one for data.

In step 410, this configuration information is sent from CLI 305 to Connection Manager 310, which maintains a configuration file for this purpose. Connection Manager 310 also maintains files of information regarding packets that are received from IP Cloud 120 by IP Driver 330.

Preferably, each TCP connection will have an associated TCP control block created by Connection Manager 310 and stored in TCP Module 320. The TCP control block keeps track of information such as the amount of buffer space available both on the sending and receiving side, the last byte sent, the last byte for which an acknowledgement was received, the maximum which may be sent, byte sequence numbers, the next byte expected and the maximum which may be received, what amount of bandwidth the tunnel may expect to use and other information. In some embodiments, the information configured by the user will be a subset of the information in the TCP control block.

In step 415, Connection Manager 310 passes the configuration information and the TCP control block to TCP Module 320, along with a request for TCP Module 320 to initiate a connection. TCP Module 320 obtains all of the remaining information that is necessary to establish a connection.

In step 420, TCP Module 320 sends a SYN, receives a SYN-ACK and hence establishes the TCP connection.

In step 425, TCP Module 320 informs the Connection Manager 310 that the tunnel has been established. The Connection Manager updates a Connection Table based on this information in step 430.

In some embodiments, Connection Manager 310 uses the Connection table for directing traffic to the right connection. For example, such information may be accessed when a packet is received from IP Cloud 120, in order to direct the packet to the proper tunnel and the proper connection within that tunnel.

In some such embodiments, Connection Manager 310 generates a hashing function based on the five-tuple information and stores the resulting hash value in a hashing table, along with the connection index. An incoming packet will include source port, destination port, source IP and destination IP information. The TCP Accelerator 325 receives the packet, uses the Connection Manager's 310 API to hash the 5-tuple information and get the corresponding connection index from a Connection Table. The corresponding connection index will point to an entry in the connection table which has all the proper information required to route the packet.

With a typical client/server configuration, the client initiates the connection while the server is passively listening to the network. This is known as a "passive open" configuration. However, according to some embodiments of the present invention, the TCP end points are treated as peers rather than as a client or server. Both peers simultaneously attempt to establish connections. This condition is referred to as a "simultaneous open." Some aspects of the invention remove the complexity of the socket layer functions such as "listen", "accept" and "bind" for the establishment of the connection. The TCP code runs at interrupt level, segments are processed as and when they are received Therefore, processing time is minimized and data transfer between SANs is accelerated.

Figure 5A:
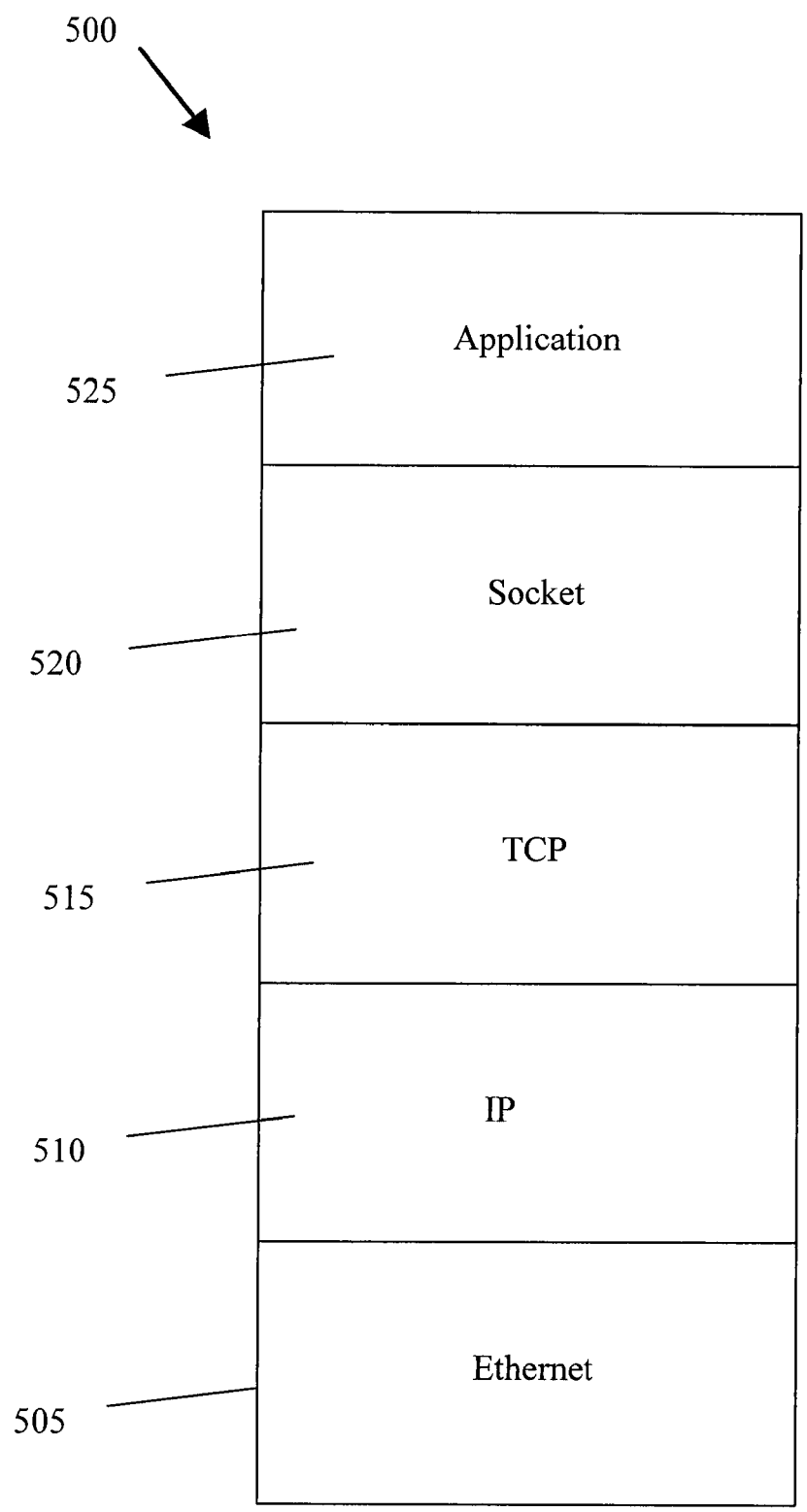
FIG. 5A illustrates a packet in a typical TCP/IP format.

In some such embodiments, this "peer level" configuration is established by removing the socket layer interface from the TCP stack. FIG. 5A illustrates the structure of conventional TCP stack 500, which includes link layer 505 (which is an Ethernet layer in this example), IP layer 510, TCP layer 515, socket layer 520 and application layer 525. Those of skill in the art will understand that variations of conventional TCP stack 500 exist. For example, while Ethernet layer 505 is a common link layer, there are other link layers known in the art that serve a similar purpose, such as serial line IP ("SLIP") and point-to-point protocol ("PPP").

When an application sends information, application layer 525 interacts with socket layer 520, which interacts with TCP layer 515 and so on. With conventional TCP stack 500, socket layer 520 maintains a separate buffer of its own. Whatever data an application wants to send is first put into a socket buffer and is later copied from the socket buffer to a TCP buffer. Therefore, the interactions between the application layer, the socket layer and the TCP layer involve a significant amount of buffer-to-buffer copying.

Figure 5B:
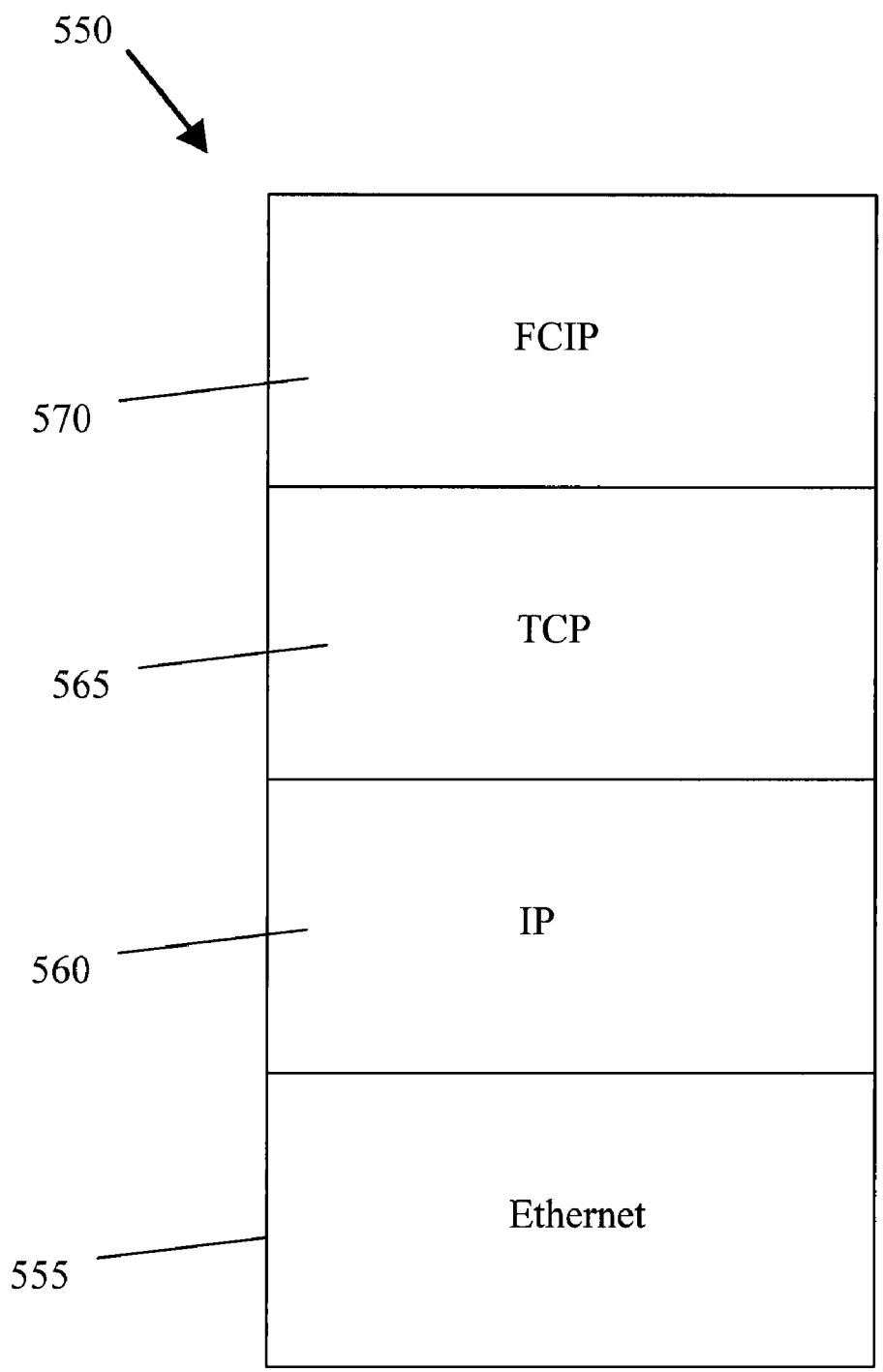
FIG. 5B illustrates a TCP/IP packet with the socket layer removed.

Some aspects of the present invention provide a TCP stack that eliminates some features of conventional TCP stack 500. FIG. 5B illustrates slim TCP stack 550, which is configured according to some preferred aspects of the present invention. Ethernet layer 555, IP layer 560 and TCP layer 565 are comparable to Ethernet layer 505, IP layer 510 and TCP layer 515 of conventional TCP stack 500. However, socket layer 520 has been removed. According to some embodiments if the invention, FCIP layer 570 is an application layer that includes software for, inter alia, encapsulation of FC frames and de-encapsulation of FCIP frames. This software may be used by, for example, the FCIP module 317. FCIP layer 570 interacts directly with TCP layer 565.

There are several advantages to removing the socket layer interface. One advantage of eliminating socket layer 520 is the elimination of socket buffers and the associated buffer-to-buffer copying. Whatever data FCIP layer 570 wants to send is not first put in a socket buffer, then copied from the socket buffer to a TCP buffer. Instead, these data are sent directly to TCP layer 565. Eliminating these buffer copies reduces a large amount of overhead.

Moreover, the socket layer interface includes the code for enabling the listen state. Therefore, by eliminating socket layer 520 one eliminates the listen state. This condition allows TCP processing at the interrupt level instead of client/server operation with a listen state.

According to some preferred aspects of the present invention, there is a higher-priority interrupt for control frames than for data frames. FC frames having a higher-priority interrupt will be processed before FC frames having a lower-priority interrupt. This allows a control frame to be processed before certain data frames, e.g., those data frames that arrive at approximately the same time as the control frame.

An overview of the process of sending a packet from SAN 105 to SAN 110 will now be described with reference to FIG. 3. First, an FC packet (e.g., FC packet 112 of FIG. 1) comes in from SAN 105 to FC Driver 315. FCIP Module 317 encapsulates the FC packet and creates an FCIP packet. Along with the FC packet, FC Driver 315 receives an interrupt. Accordingly, the processing steps proceed in an interrupt context. FC Driver 315 reads the packet and calls TCP Accelerator 325 with a pointer to the stored FC packet.

TCP Accelerator 325 determines the proper connection for frames coming from SAN 105 or IP Cloud 120. After receiving a packet from FC Driver 315 or IP Driver 330, TCP Accelerator 325 obtains the TCP control block appropriate for the connection over which the packet will be sent, then forwards the packet and the TCP control block to TCP Module 320 for further processing and routing. The TCP control block has all the necessary information required to send the packet. TCP Module 320 invokes a routine for including the FCIP packet as part of the TCP payload and sending the packet out to IP Cloud 120 via IP Driver 330.

In some embodiments of the present invention, FCIP Module 317 includes logic for distinguishing FC data frames from FC control frames, e.g., by parsing the Fiber Channel header of the FC frames. FCIP Module 317 sends data frames to a first buffer maintained by FC Driver 315 and FCIP Module 317 sends control frames to a second buffer maintained by FC Driver 315. In some preferred embodiments, these buffers are referred to as "FIFO buffers," wherein "FIFO" means "first in, first out." FC Driver 315 knows that frames in the first buffer are data frames and that frames in the second buffer are control frames. The interaction of the FIFO buffers with other elements of the system will be described below with reference to FIGS. 7 through 11.

Figure 6:
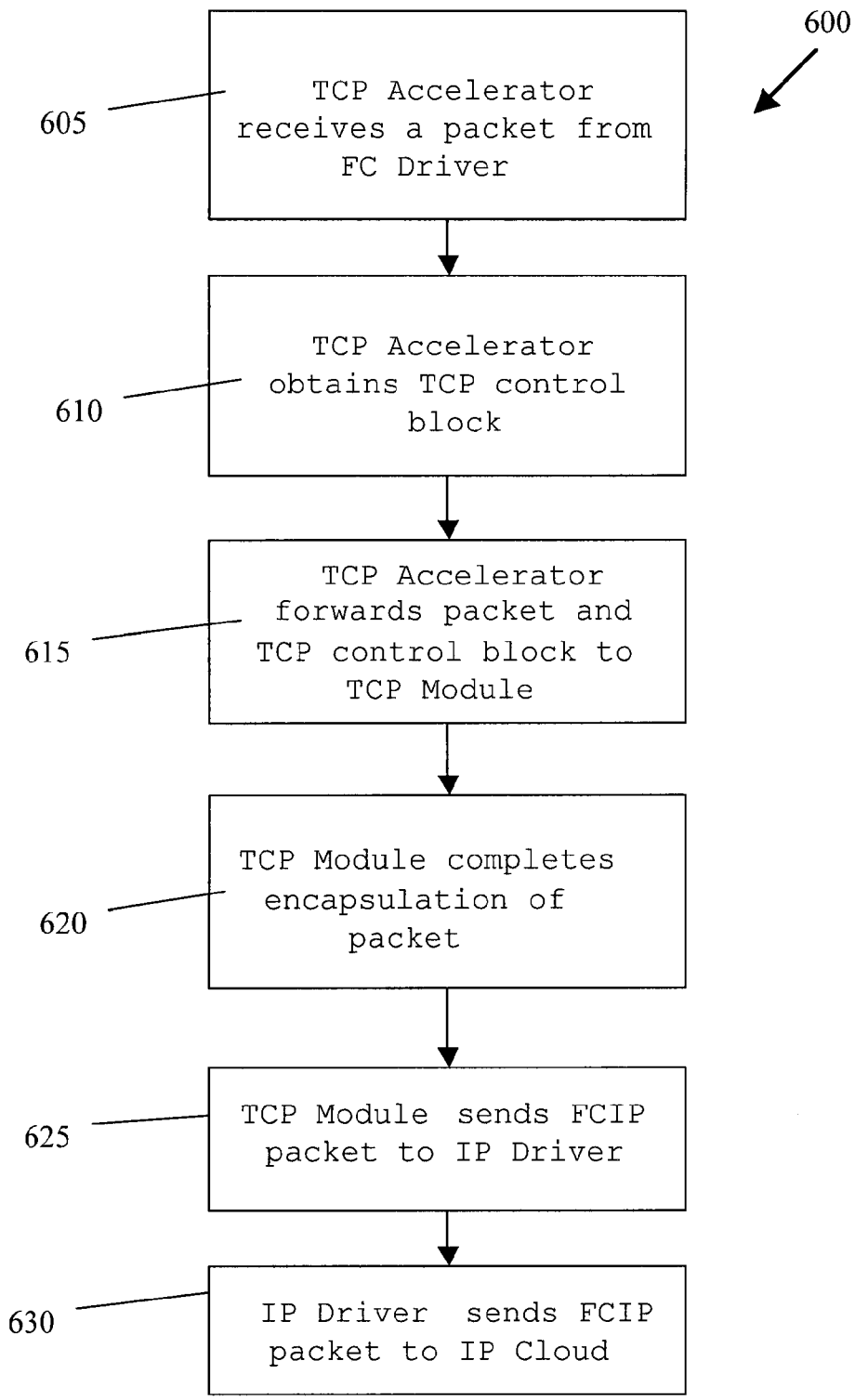
FIG. 6 is a flow chart that outlines a process of transmitting a packet from a SAN according to one aspect of the invention.

The process of sending a frame from SAN 105 to IP Cloud 120 will be further described with reference to FIG. 6. In step 605, TCP Accelerator 325 receives an FCIP packet from FC Driver 315. FC Driver 315 indicates a connection index for the packet based on the buffer with respect to which the packet is stored, according to the determination of FCIP Module 317.

In step 610, TCP Accelerator 325 obtains the TCP control block appropriate for the connection over which the FCIP packet will be sent, then forwards the FCIP packet and the TCP control block to TCP Module 320 in step 615.

In step 620, TCP Module 320 determines whether there is a window available for sending the FCIP packet to IP Cloud 120 and performs other tasks required for TCP overhead. For example, TCP Module 320 completes the encapsulation of the FCIP packet (including the addition of a TCP header), performs check summing, etc.

In step 625, TCP Module 320 forwards the FCIP packet to IP Driver 330, which forwards the packet to IP Cloud 120 in step 630.

When a packet comes in from IP Cloud 120, IP Driver 330 forwards the packet to TCP Accelerator 325. The connection index is determined by hashing the 5-tuple information obtained from the packet. Using this connection index the corresponding TCP control block is obtained. The packet is then forwarded to TCP Module 320 along with the TCP control block. The packet is de-encapsulate and forwarded to FC Driver 315 and on to SAN 105.

Conventional TCP processes transmit data in byte streams. For example, if there are 100 bytes of data to send, a conventional process may send out bytes 1 through 20 as one segment, then 21 through 40 as a second segment and so on. A header is added to each 20-byte segment prior to transmission.

However, the boundaries between segments are not stored for subsequent re-transmission. If no acknowledgment ("ACK") packet were received to indicate that a particular segment had reached its destination, a new packet would be created for re-transmission of the segment. The new packet would probably include a different amount of data than the original segment. For example, if no ACK were received for the segment that included bytes 1-20, bytes 1-30 might be re-transmitted as one segment.

This conventional method necessitates storing a lot of data in a memory, e.g. a buffer, in order to ensure that any segment of data could be re-transmitted. In the preceding example, all 100 bytes of data would be stored in a buffer pending the receipt of ACK packets for all transmitted data.

Some aspects of the present invention use novel methods of storing data for transmission from SANs and for reception by SANs. According to some such aspects of the invention, segment boundaries are retained for all transmitted data. According to some aspects of the invention, buffer copying is further reduced by storing packets for receipt and transmission by SANs in a single memory location and retaining buffer copies only of pointers to that memory location. Some such methods substantially reduce buffer copying and other such methods eliminate buffer copying altogether. In some aspects of the invention, information such as pointer information is stored in the TCP control block that is associated with each packet.

Figure 7:
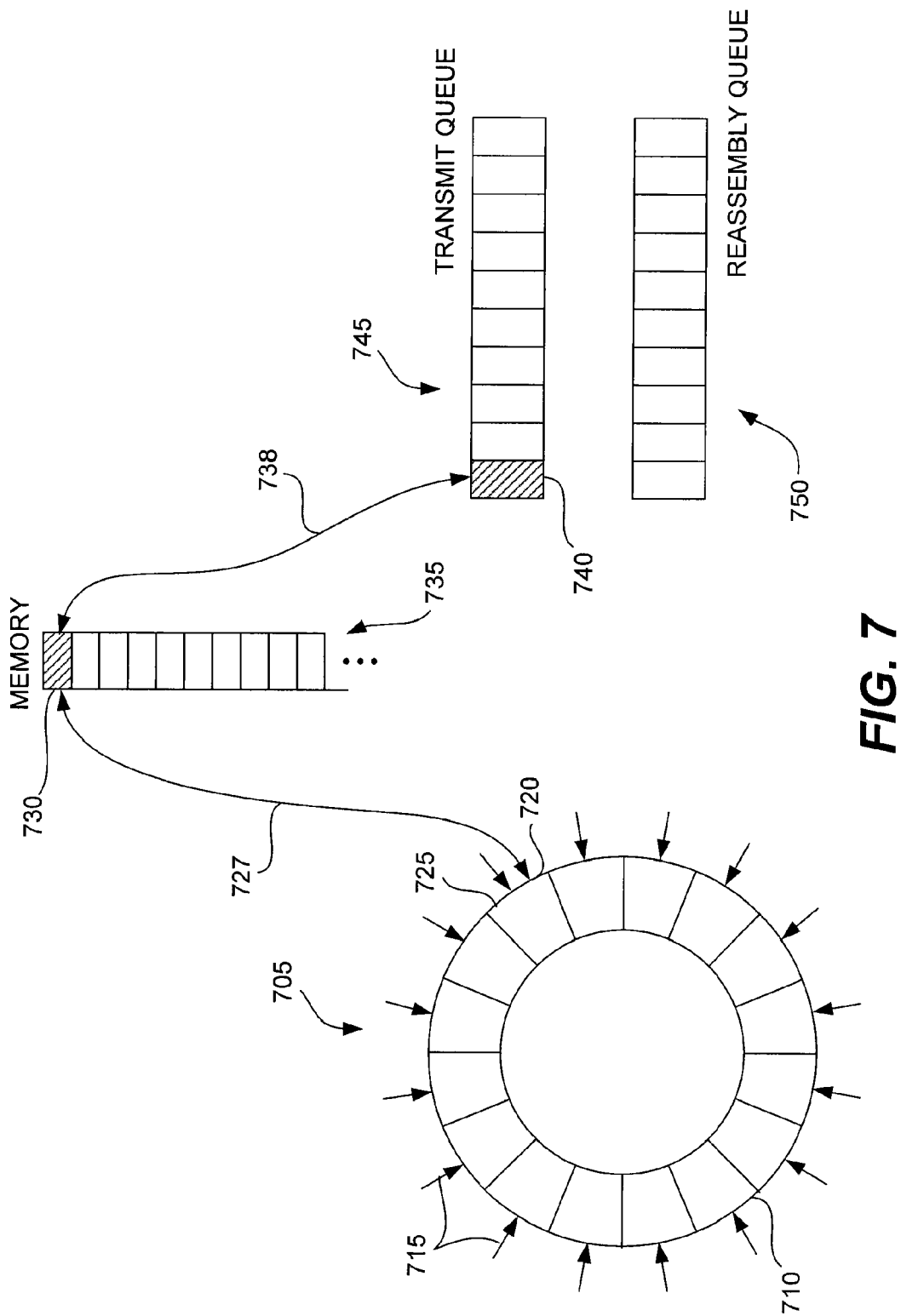
FIG. 7 illustrates a buffer of the FC Driver, a memory, a transmit queue and a reassembly queue.

FIGS. 7-11 illustrate some such aspects and embodiments of the invention. In one embodiment, buffer 705 of FIG. 7 is a FIFO buffer, as described above. Here, buffer 705 is one of two FIFO buffers associated with FC Driver 315. In this example, buffer 705 is a data packet buffer and another such buffer is a command packet buffer. The numbers of buffer cells, memory addresses, etc., depicted in FIGS. 7-11 are purely illustrative. IP Driver 330 has one or more buffers that operate in a fashion similar to what is described below with respect to buffer 705 of FC Driver 315.

Buffer 705 includes cells 710, each of which has an associated pointer 715. In this example, cell 720 is a start buffer space and cell 725 is an end buffer space. Accordingly, when a first data packet is transmitted to FC Driver from SAN 105 (e.g., in the interrupt context as described below), a pointer 727 associates cell 720 with memory location 730 of memory 735, where the first data packet will be stored until an ACK is received indicating receipt of the first packet. According to some aspects of the invention, the first data packet is stored in memory location 730 of memory 735 until an ACK is received for the data packet sent. This memory location is typically part of I/O memory of line card 1268, but could be in any convenient location.

Pointer information regarding the first packet is transmitted to TCP Accelerator 325 and is passed on to TCP Module 320. Because the first packet is an outgoing packet, TCP Module 320 associates memory location 730 with entry 740 of transmit queue 745 after the first packet has been sent out to IP Cloud 120. In this example, entry 740 includes pointer 738. If the first packet were an incoming packet, TCP Module 320 would associate memory location 730 with an entry of reassembly queue 750. In preferred embodiments, transmit queue 745 and reassembly queue 750 are both retained in a memory associated with TCP Module 320. However, these queues may be retained in any convenient memory.

As noted above, each TCP connection preferably has an associated TCP control block created by Connection Manager 310 and stored in TCP Module 320. In preferred embodiments, pointer information associated with each data packet is encoded in the TCP control block. Preferably, every TCP control block includes a portion for encoding pointer information for at least transmit queue 745 and reassembly queue 750.

If it is determined that the first data packet has not been received, the first data packet is simply re-transmitted. Although the header of the re-transmitted packet may be modified slightly, it is not necessary to create a new packet in order to re-transmit the data in the first packet because the segment boundaries are retained for the first packet.

FIGS. 8-11 provide additional details regarding pointer manipulation according to some aspects of the invention. FIG. 8A depicts buffer 705 and memory 735 at a first time and FIG. 8B depicts buffer 705, memory 735 and packet structure ("PAK") 810 at a second time.

Figure 8B:
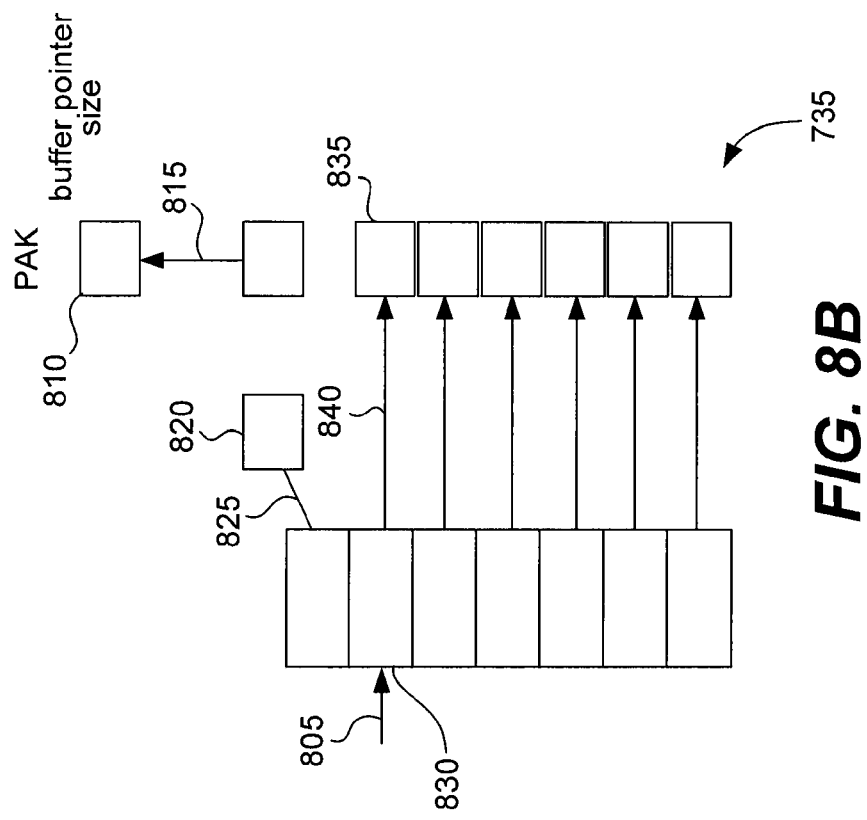
FIG. 8 depicts interactions between a buffer of the FC Driver, a memory and a PAK according to some aspects of the invention.
Figure 8A:
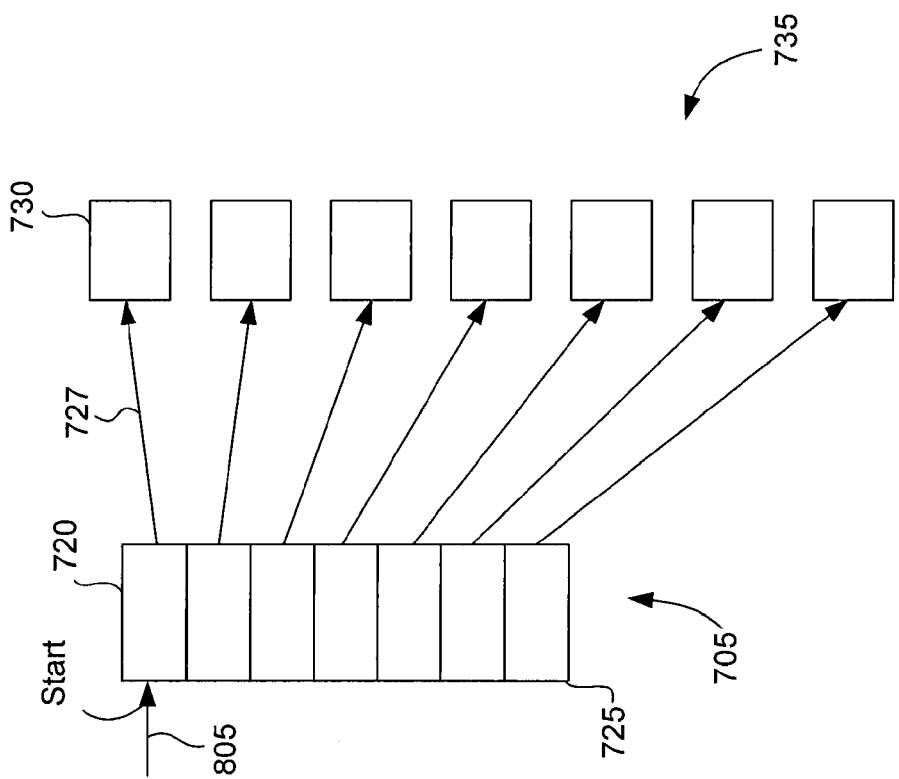

As shown in FIG. 8A, when FC Driver 315 receives the first packet, pointer 805 indicates that buffer space 720 is available. Accordingly, FC Driver 315 stores the first packet in memory location 730 and associates pointer 727 of buffer space 720 with memory location 730. An FC frame may be stored in a single memory location, but some FC frames are large enough to span several memory locations.

Then (for example, in response to an interrupt), FC Driver 315 associates memory location 730 with PAK 810 via pointer 815 and de-links memory location 730 from buffer space 720. This process frees buffer space 720, which is subsequently associated with memory location 820 via pointer 825. Pointer 805 moves to buffer space 830, which is associated with memory location 835 via pointer 840. Memory location 835 is available to receive information regarding a subsequently-received packet.

Preferably, PAK 810 includes at least pointer information regarding pointer 815 and size information regarding the first data packet. Accordingly, PAK 810 the vehicle by which information regarding data packets is sent by FC Driver 315 to TCP Accelerator 325 and TCP Module 320.

Figure 9:
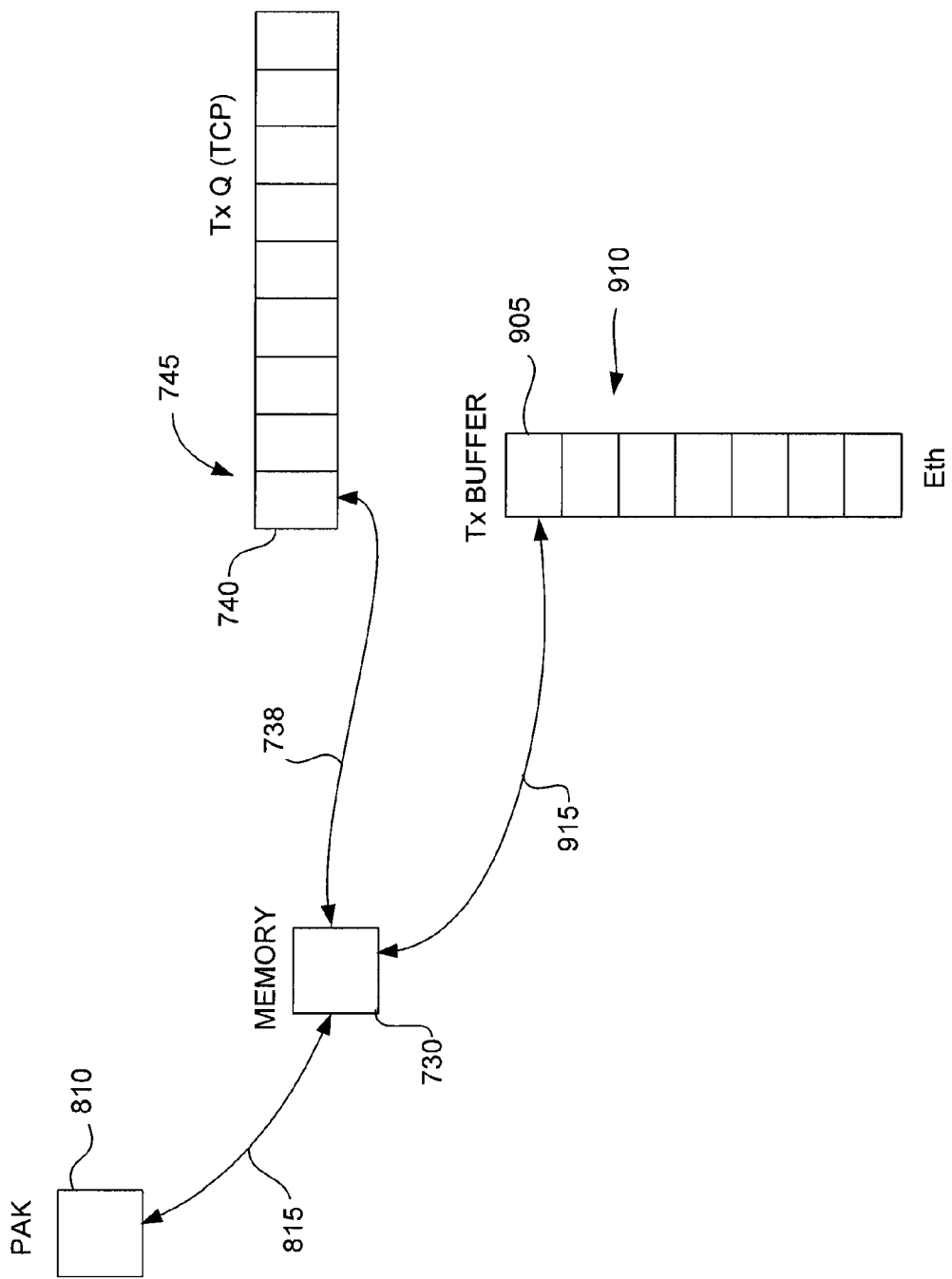
FIG. 9 depicts interactions between a transmit queue, a transmit buffer and a memory according to some aspects of the invention.

As shown in FIG. 9, TCP Module 320 uses the information in PAK 810 to associate entry 740 of transmit queue 745 with memory location 730, via pointer 738. The outgoing interface (here, IP Driver 330) includes transmit buffer 910, which is for an Ethernet driver in this example. Entry 905 of transmit buffer 910 includes pointer 915 which associates entry 905 with memory location 730.

According to preferred aspects of the invention, as much memory as possible is freed after a packet is transmitted to IP Cloud 120. According to some such aspects of the invention, only transmit queue 745 retains a pointer to memory location 730 after the first packet is transmitted, as shown in FIG. 10. In some embodiments, entry 740 of transmit queue 745 is retained until an ACK has been received, indicating receipt of the first data packet by SAN 110. In other embodiments, entry 740 is retained until a predetermined time has elapsed after the first packet is sent out to IP Cloud 120. Yet other embodiments may use alternative methods known in the art for determining that a packet has or has not been received.

According to preferred aspects of the invention, pointers do not point to the beginning of a memory location. As depicted in FIG. 11, pointer 815 does not point to the beginning of memory location 730, but allows for an offset before payload 1110 within which scratch pad 1105 is disposed. According to other such aspects, scratch pad 1105 is disposed after payload 1110. When header information is added to a packet prior to transmission, the header information can simply be put into scratch pad 1105 of memory location 730.

In ordinary TCP processing, a high amount of overhead per packet is required to process a packet in the interrupt context. Part of this overhead is due to the need to change between normal "process context" and interrupt context. For example, suppose process A is occurring when an interrupt is received. Process A is halted and the state of process A is saved. Then, the system switches to interrupt context and the service routine associated with the interrupt is scheduled and processed. After the interrupt process is completed, the system returns to process context. A scheduler must then reschedule process A and retrieve the state of process A at the time the process was halted. Accordingly, changing contexts adds a lot of overhead.

Moreover, in conventional systems, memory associated with interrupt processes is different from the memory accessible by normal processes. Therefore, every time the context changes between process context and interrupt context, data must be copied from one memory to another. In the context of normal processes, the packet memory is expected to be contiguous, whereas, in the context of interrupt processes, it need not be so. Interrupt processes can use multiple, discrete buffers for packet memory.

In preferred aspects of the present invention, all packets are processed in a modified interrupt context in order to alleviate these problems. Although much of the following discussion will describe examples of controlling interrupt processing of packets sent by a SAN to the IP Cloud, in some embodiments of the invention the process is symmetrical and applies equally to packets received from the IP Cloud.

When an interrupt is received (for example, by FC Driver 315), all processes, including steps 605 through 630 of method 600 and the buffer processes described above, are performed in the same interrupt context. The above-described pointer manipulation facilitates performing all these steps in the interrupt context, because data do not need to be copied from one buffer to another. One packet is associated with each interrupt and each packet is associated with a part of a memory associated with FC Driver 315, such as a FIFO buffer as described above.

Normally, an interrupt process cannot be preempted, but instead continues until the interrupt process is completed. However, the buffer for incoming data can store only a finite number of incoming packets. Therefore, if the interrupt processing lasts too long, subsequent incoming packets can be dropped. Preferred aspects of the present method impose controls on interrupt processing.

One way of controlling interrupt processing is by imposing a maximum lifetime on unidirectional interrupt processing in order to prevent packets from being dropped. This lifetime may be measured in CPU cycles or "loops." According to some aspects of the invention, after TCP Module 320 has caused one such packet to be sent, TCP Module 320 asks FC Driver 315 if it has another packet to send. Suppose there is another packet to send. This packet, which is associated with another part of the buffer, is then processed and sent. If this process were continued until the buffers were drained of packets, it would be very likely that incoming packets in the other direction, i.e., from the IP cloud into the Line Card, would be dropped, due to interrupt processing in the other direction getting all the CPU cycles.

Therefore, in preferred aspects of the invention, this "loop" is only permitted to happen a certain number of times before interrupt processing of outgoing packets is terminated, each loop being associated with a single packet. According to some such aspects, command packets have a higher priority than data packets and accordingly are allowed a larger number of loops before the processing stops. According to one such aspect of the invention, the maximum number of loops is 4 for command packets and 3 for data packets.

Another way of controlling interrupt processing of data being sent to the IP Cloud is by placing limitations on transmitted data. For example, some aspects of the invention limit the amount of data sent before receiving an acknowledgment packet (an "ACK") according to a "TCP sliding window." For example, the limitation may be the equivalent of 64 kb of data sent before receiving an ACK. After the data transmission limit has been reached, the interrupt processing of packets in the FC Driver' memory is suspended. After receiving an ACK, the TCP sliding window is "opened," the TCP Module queries the FC Driver as to whether it has any packets to send. If the answer is "No," the interrupt process is re-enabled. Then, packets from the FC side may once again be processed in interrupt context and transmitted until the transmission limit is attained.

According to some aspects of the present invention, receiving any incoming data will prevent the data transmission limit from being attained. For example, when a data packet is received by IP Driver 330, TCP Module 320 needs to cause an ACK packet to be sent. Before sending the ACK packet, TCP Module 320 queries FC Driver 315 to determine whether there is a packet in its memory which could be "piggy-backed" and sent along with the ACK packet to the IP Cloud.

Accordingly, preferred embodiments of the present invention keep the interrupt context disabled on the FC side for part of the time. In some embodiments, the interrupt processing is disabled most of the time. When the interrupt context is disabled and an interrupt comes in to the FC Driver, the FC Driver is not aware of the interrupt.

The interrupt may be conceived as a notification mechanism between an FC port adaptor and the FC Driver. The interrupt processing is enabled only at certain times. For example, when the system comes on line, the interrupt "notification mechanism" is enabled. At this time, when the FC Driver receives a packet, it is passed immediately through the steps of method 600 and sent to the IP cloud.

At some subsequent time, interrupt processing of outgoing packets will be stopped due to exceeding the number of loops, exceeding a data transmission limit, or by some other control on interrupt processing.

Figure 12:
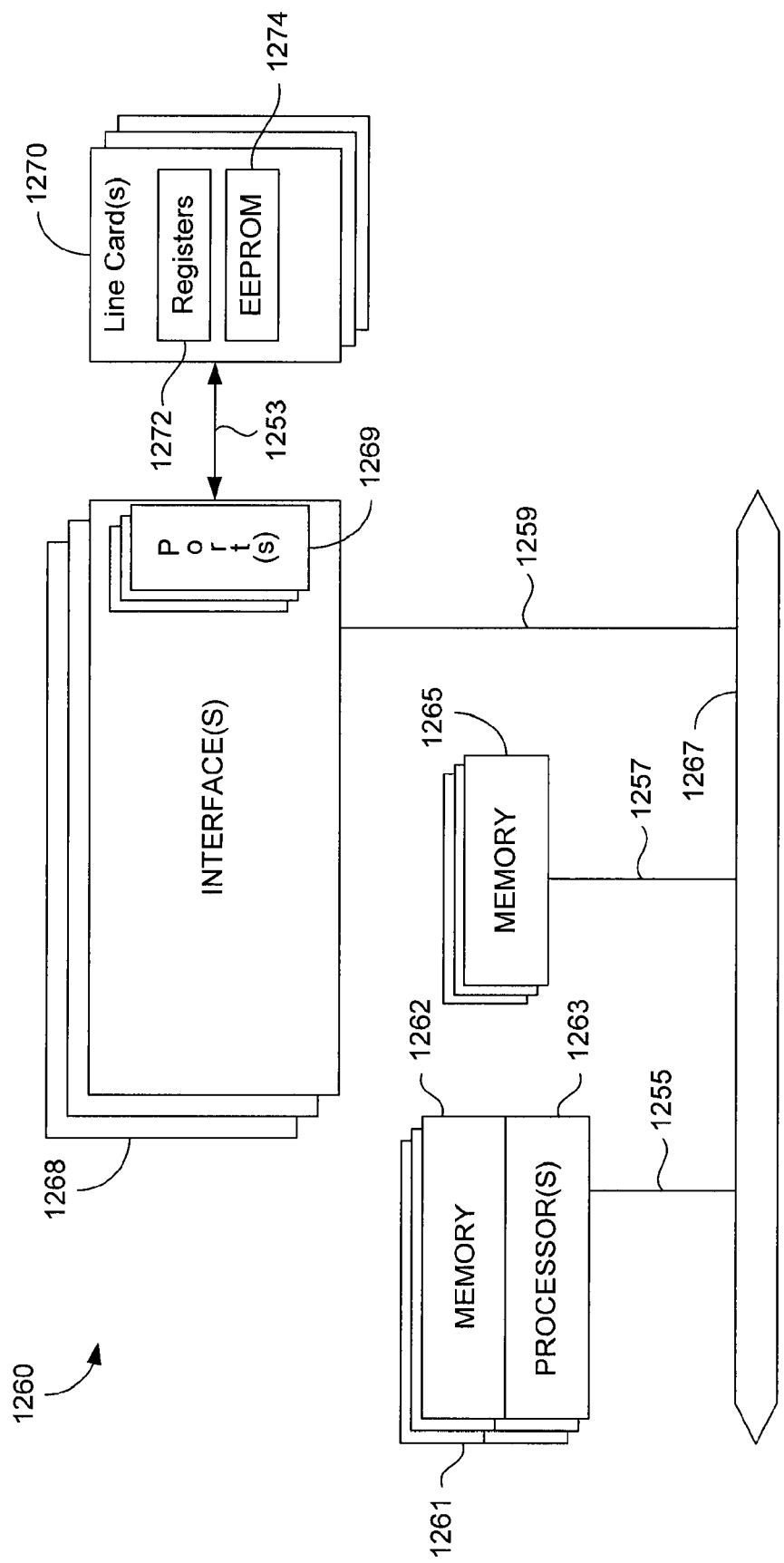
FIG. 12 depicts a network device that may be configured to perform various aspects of the invention.

Referring now to FIG. 12, a network device 1260 suitable for implementing the techniques of the present invention includes a master central processing unit (CPU) 1262, interfaces 1268, and a bus 1267 (e.g., a PCI bus). When acting under the control of appropriate software or firmware, the CPU 1262 may be responsible for implementing specific functions associated with the functions of a desired network device. For example, when configured as an intermediate router, the CPU 1262 may be responsible for analyzing FC packets, encapsulating the packets, and forwarding packets for transmission to an IP cloud. According to some embodiments, CPU 1262 accomplishes all these functions under the control of software including an operating system (e.g. Windows NT), and any appropriate applications software.

CPU 1262 may include one or more processors 1263 such as a processor from the Motorola family of microprocessors or the MIPS family of microprocessors. In an alternative embodiment, processor 1263 is specially designed hardware for controlling the operations of network device 1260. In a specific embodiment, a memory 1261 (such as non-volatile RAM and/or ROM) also forms part of CPU 1262. However, there are many different ways in which memory could be coupled to the system. Memory block 1261 may be used for a variety of purposes such as, for example, caching and/or storing data, programming instructions, etc.

The interfaces 1268 are typically provided as interface cards (sometimes referred to as "line cards"). Generally, they control the sending and receiving of data packets over the network and sometimes support other peripherals used with the network device 1260. Among the interfaces that may be provided are FC interfaces, Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like.

Generally, interfaces 1268 include ports appropriate for communication with the appropriate media. In some embodiments, one or more of interfaces 1268 includes at least one independent processor and, in some instances, volatile RAM. According to some such embodiments, these independent processors perform at least some of the functions of architecture 300, such as the encapsulation of FC frames, etc. In some embodiments, one or more of interfaces 1268 control such communications-intensive tasks as media control and management. By providing separate processors for the communications-intensive tasks, interfaces 1268 allow the master microprocessor 1262 efficiently to perform other functions such as routing computations, network diagnostics, security functions, etc.

Although the system shown in FIG. 12 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 1265) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For instance, some aspects of the invention minimize the number of TCP instructions executed per in-order packet, by maximizing the number of times TCP's header prediction code is successfully hit.

TCP header prediction is an optimized version of the TCP's processing for incoming packets for the most common cases such as in-order data and acknowledgements, which are present in most standard TCP stacks. For every incoming packet, checks are made to see if the packet requires additional processing, beyond the basic data and ACK functionality. If the packet does not have such requirements, it is handled by header prediction code which has a very small number of instructions as compared to the generic code, which makes no assumptions about the packet, but subjects it to all possible checks. One such check made by the header prediction code is to see if the advertised window in the header of the incoming packet has changed since the last packet. If it has, then header prediction code is not executed.

The advertised window in a packet header represents the amount of receive buffer available at the end-host sending that packet. This feature facilitates flow-control between the sending and receiving ends. If an end-host receives in-order data, but the application has not yet consumed it, the end-host will decrease the advertised window in the next ACK that it sends out. This way, its peer gets constant feedback, and it will not bombard the end-host with data, even if TCP's congestion window (used to slow down the transmission due to congestion) would otherwise allow such bombardment.

While this can happen in genuine cases of slower or stuck applications, it also happens for transient stages in applications that are consuming data fast enough. This is dependent on how bursty the traffic pattern is, at any point in time, due to varied reasons. For the latter cases, to avoid the overhead of not using header prediction, some aspects of the invention provide a modified TCP having a constant advertised window. Some such aspects of the invention involve sending an acknowledgement only when the FCIP application consumed the data, unlike typical TCP stacks. Such aspects of the invention optimize header prediction without compromising TCP's flow control.

Some aspects of the invention involve reducing the number of maximum retransmissions from 12-14 times (normal TCP) to a lower maximum. Some such aspects of the invention provide a maximum of 4 retransmissions.

Considering these and other variations, the scope of the invention should be determined with reference to the appended claims.

We claim:

1. A computer readable medium having a TCP stack stored therein for controlling data transmitted between storage area networks, the TCP stack comprising:
    an application layer for encapsulating outgoing frames from a first storage area network and de-encapsulating incoming frames from a second storage area network;
    a TCP layer that receives outgoing frames directly from the application layer;
    an IP layer that interacts with the TCP layer; and
    a link layer that interacts with the IP layer, wherein the TCP stack does not include a socket layer.

2. The computer readable medium of claim 1, wherein the application layer comprises a Fiber Channel Internet Protocol ("FCIP") layer.

3. The computer readable medium of claim 1, wherein the link layer comprises an Ethernet layer.

4. The computer readable medium of claim 1, wherein the TCP stack performs processing in an interrupt context.

5. A method for controlling data transmitted between storage area networks, comprising:
    receiving, at a network device, a first Fiber Channel Internet Protocol ("FCIP") packet;
    adding, by a processor, a TCP header to the first FCIP packet; and
    transmitting, by a transmitter, the first FCIP packet to the Internet, wherein the receiving, adding and transmitting steps are all performed in an interrupt context and the interrupt context is initiated by receipt of an interrupt, and the interrupt context terminates either when processes included in the interrupt have been completed, the processes comprising the receiving, adding and transmitting steps, or one or more termination related events occurs.

6. The method of claim 5, wherein the interrupt context assigns a higher priority to command packets than to data packets.

7. The method of claim 5, further comprising:
    receiving a second FCIP packet; and
    determining whether the second FCIP packet may be sent in the interrupt context.

8. The method of claim 7, wherein it is determined that the second FCIP packet may be sent in the interrupt context, further comprising:
    adding a TCP header to the second FCIP packet; and
    transmitting the second FCIP packet to the Internet, wherein the adding and transmitting steps are performed in the interrupt context.

9. The method of claim 7, wherein the determining step comprises determining whether a maximum time has elapsed during the interrupt context.

10. The method of claim 7, wherein the determining step comprises determining whether a maximum number of FCIP packets has been sent prior to receiving an acknowledgement packet during the interrupt context.

11. The method of claim 7, wherein the determining step comprises determining whether a maximum number of bytes has been sent prior to receiving an acknowledgement packet during the interrupt context.

12. The method of claim 7, wherein the steps of receiving, adding and transmitting comprise a loop and wherein the determining step comprises determining whether a maximum number of loops has occurred during the interrupt context.

13. A computer readable medium having a computer executable program stored therein for controlling data transmitted between storage area networks, the computer executable program including instructions for controlling a network device to perform the following steps:
    receiving, at the network device, a first Fiber Channel Internet Protocol ("FCIP") packet;
    adding, by a processor, a TCP header to the first FCIP packet;
    and transmitting, by a transmitter, the first FCIP packet to the Internet, wherein the receiving, adding and transmitting steps are all performed in an interrupt context and the interrupt context is initiated by receipt of an interrupt, and the interrupt context terminates either when processes included in the interrupt have been completed, the processes comprising the receiving, adding and transmitting steps, or one or more termination related events occurs.

14. The computer readable medium of claim 13, wherein the interrupt context assigns a higher priority to command packets than to data packets.

15. The computer readable medium of claim 13, wherein the computer program further comprises instructions for controlling the network device to perform the following steps:
    receiving a second FCIP packet; and
    determining whether the second FCIP packet may be sent in the interrupt context.

16. The computer readable medium of claim 15, wherein the network device determines that the second FCIP packet may be sent in the interrupt context and wherein the computer program further comprises instructions for controlling the network device to perform the following steps:
    adding a TCP header to the second FCIP packet; and
    transmitting the second FCIP packet to the Internet, wherein the adding and transmitting steps are performed in the interrupt context.

17. The computer readable medium of claim 15, wherein the determining step comprises determining whether a maximum time has elapsed during the interrupt context.

18. The computer readable medium of claim 15, wherein the determining step comprises determining whether a maximum number of FCIP packets has been sent prior to receiving an acknowledgement packet during the interrupt context.

19. The computer readable medium of claim 15, wherein the determining step comprises determining whether a maximum number of bytes has been sent prior to receiving an acknowledgement packet during the interrupt context.

20. The computer readable medium of claim 15, wherein the steps of receiving, adding and transmitting comprise a loop and wherein the determining step comprises determining whether a maximum number of loops has occurred during the interrupt context.

21. An apparatus for controlling data transmitted between storage area networks, the apparatus comprising:
means for receiving a first Fiber Channel Internet Protocol ("FCIP") packet;
means for adding a TCP header to the first FCIP packet; and
means for transmitting the first FCIP packet to the Internet, wherein the receiving, adding and transmitting means are all configured to operate in an interrupt context and the interrupt context is initiated by receipt of an interrupt, and the interrupt context terminates either when processes included in the interrupt have been completed, the processes comprising the receiving, adding and transmitting steps, or one or more termination related events occurs.

22. The apparatus of claim 21, wherein the interrupt context comprises assigning a higher priority to command packets than to data packets.

23. The apparatus of claim 21, wherein the apparatus further comprises:
means for receiving a second FCIP packet; and
means for determining whether the second FCIP packet may be sent in the interrupt context.

24. The apparatus of claim 21, wherein the apparatus comprises a router.

25. The apparatus of claim 21, wherein the apparatus comprises a switch.

26. The apparatus of claim 21, wherein the apparatus comprises a fiber channel port adapter card.

27. The apparatus of claim 23, wherein it is determined that the second FCIP packet may be sent in the interrupt context, further comprising:
means for adding a TCP header to the second FCIP packet; and
means for transmitting the second FCIP packet to the Internet, wherein the adding and transmitting are performed in the interrupt context.

28. The apparatus of claim 23, wherein the determining means comprises means for determining whether a maximum time has elapsed during the interrupt context.

29. The apparatus of claim 23, wherein the determining means comprises means for determining whether a maximum number of FCIP packets has been sent prior to receiving an acknowledgement packet during the interrupt context.

30. The apparatus of claim 23, wherein the determining means comprises means for determining whether a maximum number of bytes has been sent prior to receiving an acknowledgement packet during the interrupt context.

31. The apparatus of claim 23, wherein the receiving, adding and transmitting means comprise a loop and wherein the determining means comprises means for determining whether a maximum number of loops has occurred during the interrupt context.

32. A method for controlling data transmitted between a first network device and a second network device, comprising:
receiving a first Fiber Channel Internet Protocol ("FCIP") packet from a storage area network ("SAN") at the first network device;
adding, by a processor, a TCP header to the first FCIP packet; and
transmitting, by a transmitter, the first FCIP packet from the first network device to the second network device via the Internet, wherein the receiving, adding and transmitting steps are all performed in an interrupt context and the interrupt context is initiated by receipt of an interrupt, and the interrupt context terminates either when processes included in the interrupt have been completed, the processes comprising the receiving, adding and transmitting steps, or one or more termination related events occurs.

33. The method of claim 32, wherein neither the first network device nor the second network device listens for connection requests under TCP.

34. The method of claim 32, wherein the first network device and the second network device are in the condition of simultaneous open.

35. A network device for controlling data transmitted between storage area networks, the network device comprising:
a first interface configured to receive a first Fiber Channel Internet Protocol ("FCIP") packet;
a processor configured to add a TCP header to the first FCIP packet to cause the first FCIP packet to be transmitted to the Internet, wherein the receiving of the first FCIP packet, the adding of the TCP header and the transmitting of the first FCIP packet are all performed in an interrupt context and the interrupt context is initiated by receipt of an interrupt, and the interrupt context terminates either when processes included in the interrupt have been completed, the processes comprising the receiving, adding and transmitting steps, or one or more termination related events occurs.

36. The network device of claim 35, wherein the network device comprises a line card and wherein the processor is associated with the line card.

* * * * *